United States Patent
Nakai et al.

(10) Patent No.: US 11,072,283 B2
(45) Date of Patent: Jul. 27, 2021

(54) VEHICLE PERIPHERY MONITORING DEVICE AND VEHICLE PERIPHERY MONITORING METHOD

(71) Applicant: KABUSHIKI KAISHA TOKAI-RIKA-DENKI-SEISAKUSHO, Aichi (JP)

(72) Inventors: Toshinari Nakai, Aichi (JP); Seiji Kondo, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 16/769,288

(22) PCT Filed: Nov. 27, 2018

(86) PCT No.: PCT/JP2018/043629
§ 371 (c)(1),
(2) Date: Jun. 3, 2020

(87) PCT Pub. No.: WO2019/116886
PCT Pub. Date: Jun. 20, 2019

(65) Prior Publication Data
US 2020/0369205 A1 Nov. 26, 2020

(30) Foreign Application Priority Data

Dec. 15, 2017 (JP) .............................. JP2017-240702

(51) Int. Cl.
*B60R 1/00* (2006.01)
*B60K 35/00* (2006.01)

(52) U.S. Cl.
CPC ................ *B60R 1/00* (2013.01); *B60K 35/00* (2013.01); *B60K 2370/143* (2019.05);
(Continued)

(58) Field of Classification Search
CPC ........... G06K 9/00778; G06K 9/00785; G06K 9/00791; G06K 9/00798; G06K 9/00805;
(Continued)

(56) References Cited

U.S. PATENT DOCUMENTS

| 2007/0165108 A1* | 7/2007 | Yuasa | B60R 1/00 348/148 |
| 2011/0032374 A1* | 2/2011 | Imanishi | B60R 1/00 348/222.1 |
| 2014/0277825 A1* | 9/2014 | Tippelhofer | G08G 1/167 701/1 |

FOREIGN PATENT DOCUMENTS

| JP | 10-257482 A | 9/1998 | |
| JP | 2017069852 A * | 4/2017 | |
| WO | WO-2017110069 A1 * | 6/2017 | ............ B60W 50/14 |

* cited by examiner

*Primary Examiner* — Nathnael Aynalem
(74) *Attorney, Agent, or Firm* — Roberts Calderon Safran & Cole P.C.

(57) ABSTRACT

A vehicle periphery monitoring device acquires first image information of a vehicle rear side and second image information of vehicle rear lateral sides. Second points at infinity of the second image information are made to approximately coincide with a first point at infinity of the first image information, and the first image information and the second image information are combined, and first composite image information is generated. When sensing a request to change a viewpoint toward a vehicle rear lateral side, second composite image information that is viewed with a virtual viewpoint having been moved toward a vehicle lateral side is generated. Further, when a path changing operation of an operation portion that is used in changing a path is completed, third composite image information that is viewed with a virtual viewpoint having been moved toward the side of the path change is generated.

7 Claims, 8 Drawing Sheets

(52) U.S. Cl.
CPC .. *B60K 2370/152* (2019.05); *B60K 2370/176* (2019.05); *B60R 2300/105* (2013.01); *B60R 2300/303* (2013.01); *B60R 2300/802* (2013.01)

(58) Field of Classification Search
CPC ........... G06K 9/00812; G06K 9/00818; G06K 9/00825; G06K 9/00845; G06K 9/325; G06K 2209/15; G06K 2209/23; G06T 2207/30236; G06T 2207/30248; G06T 2207/30252; G06T 2207/30256; G06T 2207/30261; G06T 2207/30264; G06T 2207/30268; G08G 1/16; G08G 1/116; G08G 1/167; G08G 1/168; G08G 1/20; B60W 50/14; B60W 2050/143; B60W 2550/10; B60W 2550/14; G01S 17/93; G01S 17/931; B62D 15/029; B60K 2370/176; B60K 2370/1868; B60K 2370/21; B60K 2370/52; B60K 2370/797; B60K 35/00; B60K 2370/152; B60R 1/00; B60R 2300/70; B60R 2300/80; B60R 2300/802; B60R 11/04; B60R 2001/1215; B60R 2025/1013; B60R 2025/1016; B60R 2300/105; B60R 2300/106; B60R 2300/806; B60R 2300/8066; B60R 2300/8073; B60R 2300/8086; B60R 2300/8093; B60R 2300/303; B60R 2300/305; H04N 7/181
USPC ........................................................ 348/148
See application file for complete search history.

VEHICLE PERIPHERY MONITORING DEVICE AND VEHICLE PERIPHERY MONITORING METHOD

CROSS-REFERENCE TO RELATED APPLICATIONS

The present application is a U.S. National Phase of PCT/JP2018/043629 filed on Nov. 27, 2018, claiming priority under 35 USC 119 from Japanese Patent Application No. 2017-240702 filed Dec. 15, 2017, the disclosure of which is incorporated by reference herein.

TECHNICAL FIELD

The present disclosure relates to a vehicle periphery monitoring device, and in particular, relates to an effective technique that is applied to a vehicle periphery monitoring device that displays images of the vehicle rear side and the vehicle rear lateral sides on an image display device that is set within a vehicle cabin.

BACKGROUND ART

A vehicle peripheral state display device is disclosed in Japanese Patent Application Laid-Open (JP-A) No. H10-257482. This vehicle peripheral state display device sets one point at infinity by combining the points at infinity of three images that are at the left and right sides and the rear side of the vehicle, and generates a composite image in which the images of the left and right sides and the image of the rear side are seen from one virtual viewpoint. This composite image is displayed on a liquid crystal panel that is set at the instrument panel of a vehicle cabin interior.

Even in a case in which a following vehicle approaches the own vehicle, a vehicle at the rear side of the following vehicle can be confirmed by side door mirrors of related art. However, in the aforementioned vehicle peripheral state display device, there are cases in which the vehicle at the rear side, which is blocked by the following vehicle, is not displayed due to the conversion to the viewpoint at the rear side. For example, after a driver confirms the composite image that is displayed on the liquid crystal panel, the driver operates the turn signal switch and makes the blinker blink, and then operates the steering and effects a path change such as a lane change, a left turn, a right turn, or the like of the vehicle. Therefore, if that vehicle at the rear side is blocked by the following vehicle, there is the possibility that the driver will execute a path change in a state of not noticing the vehicle at the rear side, and there is room for improvement.

SUMMARY OF INVENTION

Technical Problem

In view of the above-described circumstances, the present disclosure provides a vehicle periphery monitoring device that, before and after completion of an operation of changing the path, enables viewing of a region that is blocked in a composite image.

Solution to Problem

In order to solve the aforementioned problem, a vehicle periphery monitoring device relating to a first aspect of the present disclosure comprises: an image control section that acquires first image information of a vehicle rear side and second image information of vehicle rear lateral sides that are captured by using imaging devices, and makes second points at infinity that are at second positions in a vehicle transverse direction of the second image information approximately coincide with a first point at infinity that is at a first position in the vehicle transverse direction of the first image information, and combines the first image information and the second image information, and generates first composite image information to be outputted to an image display device; and a point at infinity moving section that, when sensing a request to change a viewpoint toward a vehicle rear lateral side, makes the first point at infinity and the second points at infinity approximately coincide in the middle of the first position and a second position, and combines the first image information and the second image information, and generates second composite image information to be outputted to the image display device, or, when a path changing operation of an operation portion that is used in changing a path of a vehicle is completed, makes the first point at infinity approximately coincide with the second points at infinity at the second position, and combines the first image information and the second image information, and generates third composite image information to be outputted to the image display device.

The vehicle periphery monitoring device relating to the first aspect has the image control section and the point at infinity moving section. The image control section acquires first image information of the vehicle rear side and second image information of the vehicle rear lateral sides that are captured by using imaging devices. At the image control section, second points at infinity that are at second positions in the vehicle transverse direction of the second image information are made to approximately coincide with a first point at infinity that is at a first position in the vehicle transverse direction of the first image information, and the first image information and the second image information are combined, and first composite image information to be outputted to an image display device is generated.

Here, when sensing a request to change the viewpoint toward a vehicle rear lateral side, the point at infinity moving section makes the first point at infinity and the second points at infinity approximately coincide in the middle of the first position and a second position, and combines the first image information and the second image information, and generates second composite image information to be outputted to the image display device. Further, when a path changing operation of an operation portion that is used in changing the path of the vehicle is completed, the point at infinity moving section makes the first point at infinity approximately coincide with the second points at infinity at the second position, and combines the first image information and the second image information, and generates third composite image information to be outputted to the image display device. At the point at infinity moving section, one of or both of the second composite image information and the third composite image information are generated.

Therefore, before the operation of changing the path of the vehicle is completed, the image of a region (e.g., a laterally rearward vehicle) that is blocked by the combining of the first composite image information (e.g., that is blocked by the following vehicle) is made to be a composite image that is based on the second composite image information that is seen from a virtual viewpoint that has been moved toward a vehicle lateral side. Therefore, the existence of a laterally rearward vehicle for example can be confirmed. Further, after the operation of changing the path of the vehicle is completed, there is made to be a composite image that is based on third composite image information that is seen from a virtual viewpoint that has been moved further toward the vehicle lateral side, and therefore, the existence of the laterally rearward vehicle for example can be confirmed more clearly. At the vehicle periphery monitoring device, one of or both of confirmation based on the second composite image information and confirmation based on the third composite image information can be carried out.

Further, as compared with the viewing angle of a conventional side view mirror, the amount of movement of the viewpoint can be reduced, and the stability can be improved.

In a vehicle periphery monitoring device relating to a second aspect of the present disclosure, in the vehicle periphery monitoring device relating to the first aspect, the imaging devices include a first imaging device, which captures images of the vehicle rear side and generates the first image information, and second imaging devices, which capture images of the vehicle rear lateral sides and generate the second image information, and the image display device displays any of the first composite image information, the second composite image information and the third composite image information.

In accordance with the vehicle periphery monitoring device relating to the second aspect, the imaging devices include a first imaging device and second imaging devices. The first imaging device captures an image of the vehicle rear side and generates the first image information. The second imaging devices capture images of the vehicle rear lateral sides and generate the second image information. Further, the image display device displays a composite image that is based on any of the first composite image information, the second composite image information and the third composite image information. The vehicle periphery monitoring device, which is installed in the vehicle and includes the image control section, the point at infinity moving section, the first imaging device, the second imaging devices and the image display device, can thereby be constructed.

In a vehicle periphery monitoring device relating to a third aspect of the present disclosure, in the vehicle periphery monitoring device relating to the first aspect or the second aspect, the point at infinity moving section has a sensing section that is disposed at the operation portion or in a vicinity of the operation portion, and that senses a request to change the viewpoint.

In accordance with the vehicle periphery monitoring device relating to the third embodying aspect, the point at infinity moving section has the sensing section that senses a request to change the viewpoint. The sensing section is disposed at the operation portion or in a vicinity of the operation portion. Therefore, because the sensing section is disposed at the operation portion or in a vicinity of the operation portion, the virtual viewpoint is immediately moved in relation to the path changing operation that uses the operation portion, and a composite image of the vehicle rear side and the vehicle laterally rear sides can be displayed on the image display device.

In a vehicle periphery monitoring device relating to a fourth aspect of the present disclosure, in the vehicle periphery monitoring device relating to any one of the first aspect through the third aspect, the operation portion is a turn signal lever that is used in changing the path of the vehicle, or is a steering that is used in changing the path of the vehicle.

In accordance with the vehicle periphery monitoring device relating to the fourth aspect, the operation portion is a turn signal lever or a steering that is used in changing the path of the vehicle. Therefore, the virtual viewpoint is immediately moved in relation to the path changing operation that uses the turn signal lever or the steering, and a composite image of the vehicle rear side and the vehicle laterally rear sides can be displayed on the image display device.

In a vehicle periphery monitoring device relating to a fifth aspect of the present disclosure, in the vehicle periphery monitoring device relating to the third aspect, the sensing section is a touch sensor or a Hall sensor.

In accordance with the vehicle periphery monitoring device relating to the fifth aspect, the sensing section is a touch sensor or a Hall sensor. Therefore, a request to change the viewpoint toward a vehicle laterally rear side can be sensed by a simple structure, and the virtual viewpoint is moved immediately in relation to the path changing operation that uses the operation portion, and a composite image of the vehicle rear side and the vehicle rear lateral sides can be displayed on the image display device.

Advantageous Effects of Invention

In accordance with the present disclosure, there can be provided a vehicle periphery monitoring device that, before and after completion of an operation of changing the path, enables viewing of a region that is blocked due to the combining of a composite image.

DESCRIPTION OF EMBODIMENTS

First Embodiment

A vehicle periphery monitoring device and an image display method thereof that relate to a first embodiment of the present disclosure are described hereinafter by using FIG. 1 through FIG. 6. Here, the vehicle periphery monitoring device is applied to a vehicle such as an automobile or the like. Further, in the drawings, arrow FR that is shown appropriately indicates the vehicle frontward direction, arrow W indicates the vehicle transverse direction, and arrow UP indicates the vehicle upward direction. Note that the directions of application of the vehicle periphery monitoring device are not limited to those of the present embodiment.

(System Structure of Vehicle Periphery Monitoring Device)

Figure 1:
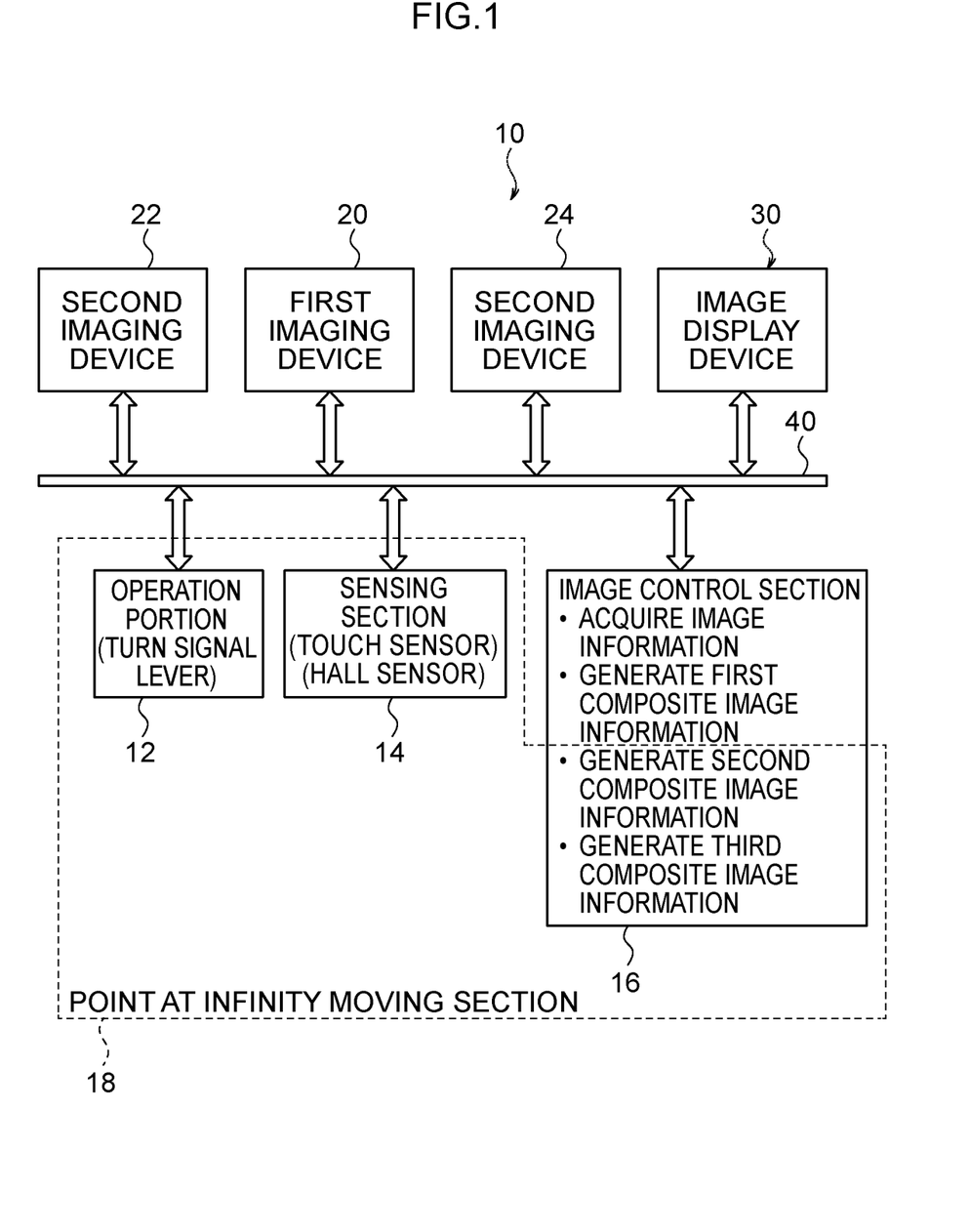
FIG. 1 is a block drawing for explaining the system structure of a vehicle periphery monitoring device relating to a first embodiment of the present disclosure.

As shown in FIG. 1, a vehicle periphery monitoring device 10 relating to the present embodiment has, as the main structures thereof, an image control section 16 and a point at infinity moving section 18. Further, the vehicle periphery monitoring device 10 is structured to include a first imaging device 20, a second imaging device 22 and a second imaging device 24, and an image display device 30. The vehicle periphery monitoring device 10 is, as shown in FIG. 2, installed in a vehicle V.

Figure 2:
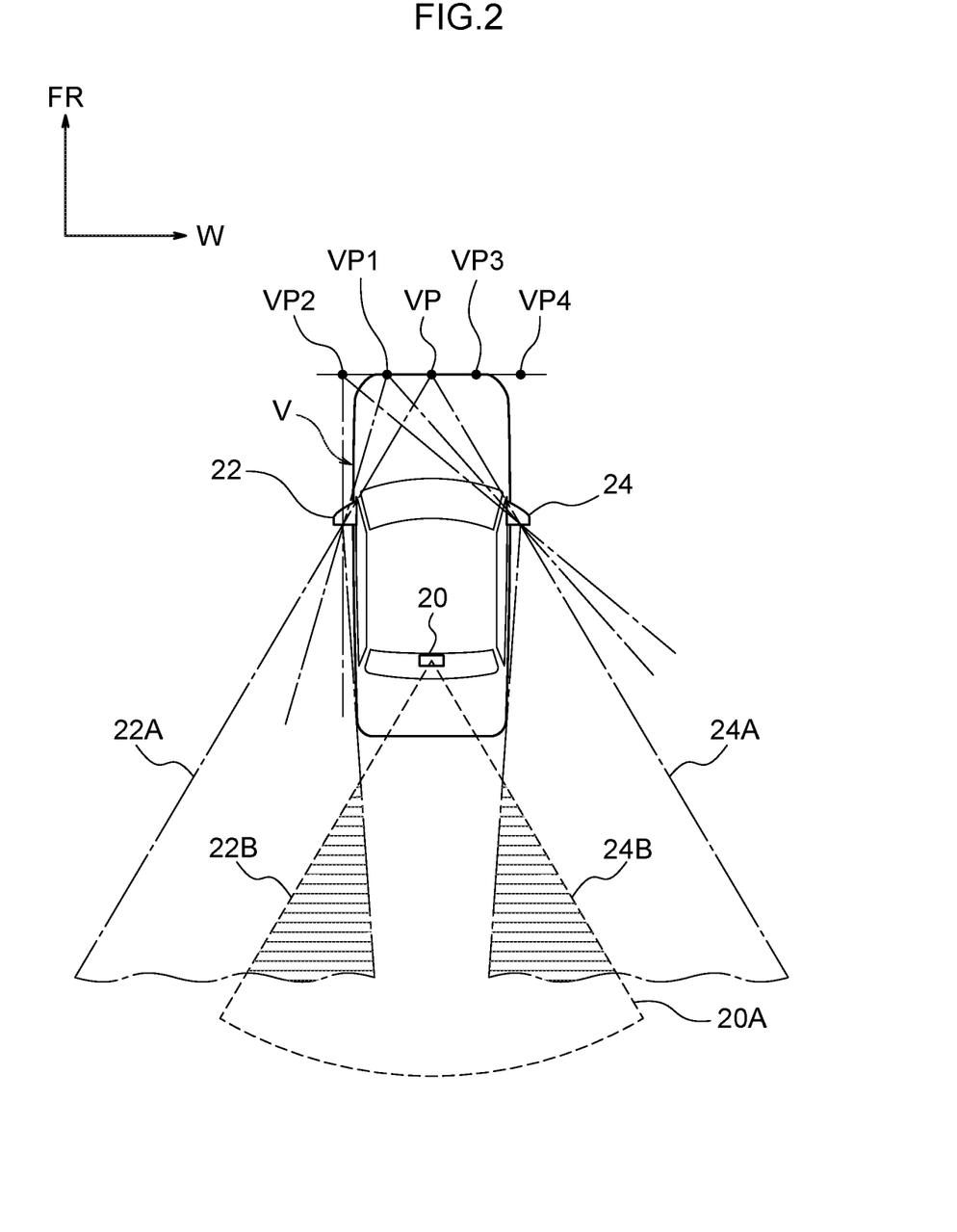
FIG. 2 is a plan view that schematically shows positions of placement, at a vehicle, of imaging devices that construct the vehicle periphery monitoring device shown in FIG. 1, and fields of view at the vehicle rear side and the vehicle rear lateral sides.

As shown in FIG. 2, the first imaging device 20 is an onboard camera (a rear camera) that is set at the vehicle rear portion, e.g., at the rear spoiler, at a vicinity of the rear spoiler, at the interior of the vehicle cabin at the inner side of the rear windshield, at the interior of the cargo compartment, above the license plate, at an emblem, or the like. At the first imaging device 20, an image of the vehicle rear side is captured in the range of a viewing angle 20A that is shown by the dashed lines, and first image information is generated from the captured image of the vehicle rear side. As shown in FIG. 1, the first image information that is outputted from the first imaging device 20 is outputted to a bus 40.

As shown in FIG. 2, the second imaging device 22 is an onboard camera (a left side camera) that is set at the vehicle left side portion, e.g., at the left side door mirror, in a vicinity of the left side door mirror, or at a position at which a left side door mirror is normally mounted, or the like. At the second imaging device 22, an image of the vehicle rear left side is captured in the range of a viewing angle 22A that is shown by the one-dot chain lines, and second image information is generated from the captured image of the vehicle rear left side. As shown in FIG. 1, the second image information that is outputted from the second imaging device 22 is outputted to the bus 40.

As shown in FIG. 2, the second imaging device 24 is an onboard camera (a right side camera) that is set at the vehicle right side portion, e.g., at the right side door mirror, in a vicinity of the right side door mirror, or at a position at which a right side door mirror is normally mounted, or the like. In the same way as the second imaging device 22, at the second imaging device 24, an image of the vehicle rear right side is captured in the range of a viewing angle 24A that is shown by the one-dot chain lines, and second image information is generated from the captured image of the vehicle rear right side. As shown in FIG. 1, the second image information that is outputted from the second imaging device 24 is outputted to the bus 40.

Figure 3A:
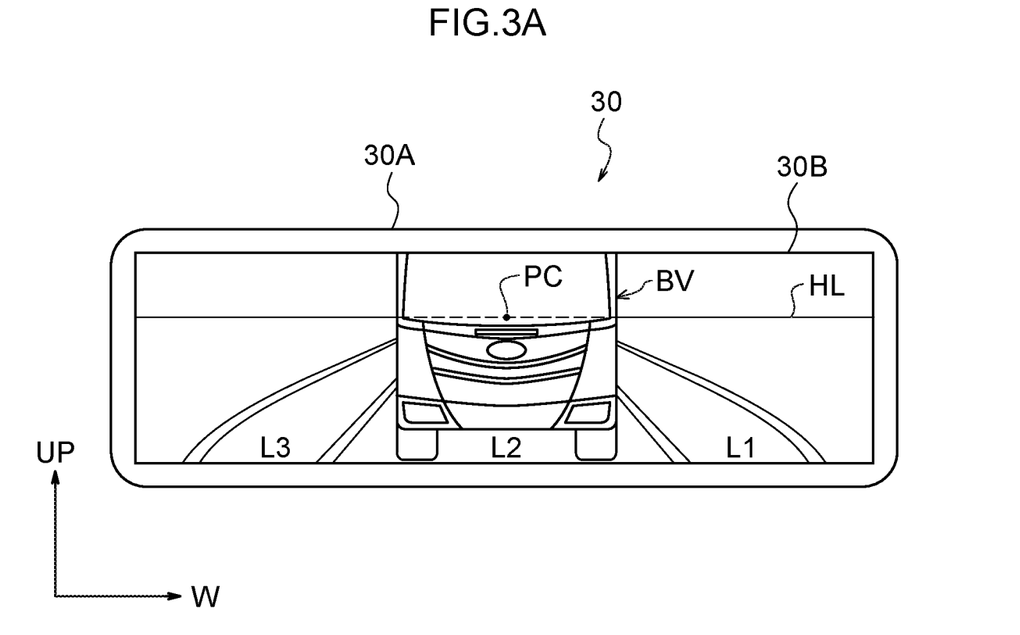
FIG. 3A is a front view that is seen from the driver and shows an image display device, which constructs the vehicle periphery monitoring device shown in FIG. 1, and a composite image that is displayed on the image display device.

As shown in FIG. 3A, the image display device 30 has a device housing 30A and a display region 30B. The device housing 30A is formed in the shape of a rectangle whose length direction is the vehicle transverse direction and whose short-side direction is the vehicle vertical direction. The display region 30B is provided at the vehicle rear side surface of the device housing 30A, and is formed in the shape of a rectangle that is one size smaller than the device housing 30A. The image display device 30 is set, instead of an inner mirror of related art, at the vehicle cabin interior at the inner side of the front windshield, at the vehicle transverse direction intermediate portion and the vehicle upper side. The display region 30B here is structured by using a liquid crystal display (LCD). Electronic parts, which drive the liquid crystal display and display images, are built-into the interior of the device housing 30A.

As shown in FIG. 1, the image display device 30 is connected to the bus 40, and acquires, via the bus 40, image information that is outputted from the image control section 16.

Note that, instead of a liquid crystal display, another display such as an organic electro-luminescence display (OELD) or the like may be used for the display region 30B.

As shown in FIG. 1, the image control section 16 is connected to the bus 40, and, via the bus 40, is connected to the first imaging device 20, the second imaging device 22, the second imaging device 24, and the point at infinity moving section 18, respectively. The image control section 16 acquires the first image information that is outputted from the first imaging device 20, and the second image information that are outputted from the second imaging device 22 and the second imaging device 24. At the image control section 16, the first image information and the second image information are combined, and the combined composite image information (first composite image information) is outputted to the image display device 30. As shown in FIG. 3A, a composite image that is based on the composite image information is displayed on the display region 30B of the image display device 30. Here, as an example of the composite image of the first composite image information, an image of a three-lane road, which includes a first traveling lane (overtaking lane) L1, a second traveling lane L2 and a third traveling lane L3 that are at the vehicle rear side and the vehicle rear lateral sides, is displayed on the image display device 30. Further, an image of a following vehicle BV, which is in the midst of traveling behind the vehicle (the own vehicle) V in the second traveling lane L2, is displayed on the image display device 30. The following vehicle BV is a truck here. The region, which is displayed as an image on the image display device 30 and is denoted by reference letters HL, is the horizon.

The first image information and the second image information are acquired at the image control section 16. An image 32 that is based on the first image information captured by using the first imaging device 20, an image 34 that is based on the second image information captured by using the second imaging device 22, and an image 36 that is based on the second image information captured by using the second imaging device 24, are respectively displayed in FIG. 3B. In the image 32, point at infinity P1 of the image at the vehicle rear side is conveniently shown at a vehicle transverse direction intermediate position (first position). Here, the point at infinity P1 is set so as to coincide with the horizon HL. Further, in the image 34, point at infinity P3 of the image at the vehicle rear left side is conveniently shown at a position (second position) that is offset toward the vehicle transverse direction left side. Here, laterally rearward vehicle SV1, which is in the midst of traveling and is positioned in the third traveling lane L3 at the rear left side with respect to the vehicle V and the following vehicle BV respectively, and laterally rearward vehicle SV2, which is in the midst of traveling further behind the laterally rearward vehicle SV1, are displayed in the image 34. The laterally rearward vehicle SV1 is a passenger vehicle, and the laterally rearward vehicle SV2 is a motorcycle. In the image 36, point at infinity P2 of the image at the vehicle rear right side is conveniently shown at a position (second position) that is offset toward the vehicle transverse direction right side. In the same way as the point at infinity P1, the point at infinity P3 and the infinite point P2 are set so as to coincide with the horizon HL.

Figure 3B:
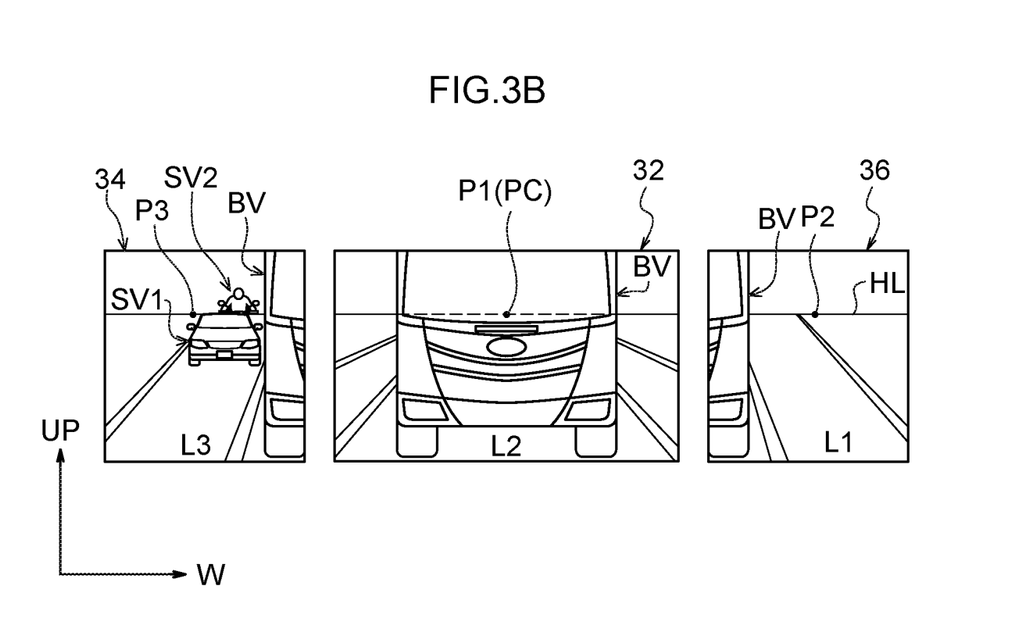
FIG. 3B is a drawing showing images of the vehicle rear side and the vehicle lateral sides that are captured by the respective imaging devices.

At the image control section 16, first composite image information is generated in which the point at infinity P2 and the point at infinity P3 are respectively made to approximately coincide with the infinite point P1 that is at the first position shown in FIG. 3B and the first image information and the second image information are combined. This first composite image information is outputted to the image display device 30, and a composite image, which is shown in FIG. 2 and is created as an image seen from one virtual viewpoint VP that is positioned at a vehicle transverse direction intermediate portion and the vehicle front side, is displayed on the display region 30B of the image display device 30 as shown in FIG. 3A. The position at which the point at infinity P1, the point at infinity P2 and the infinite point P3 respectively are made to coincide, corresponds to the first position, and is indicated conveniently by reference letters PC in FIG. 3A. At the image control section 16, in the generating of the first composite image information, in order to display the image within the display region 30B of the image display device 30 and to prioritarily display the first image information, image information 22B and 24B of the regions, which are shown in FIG. 2, of the second image information that overlap the first image information are deleted by the combining. Further, at the image control section 16, an image interpolation method such as the nearest neighbor method, the bilinear method, the bicubic method or the like is used in combining the first image information and the second image information.

Figure 4A:
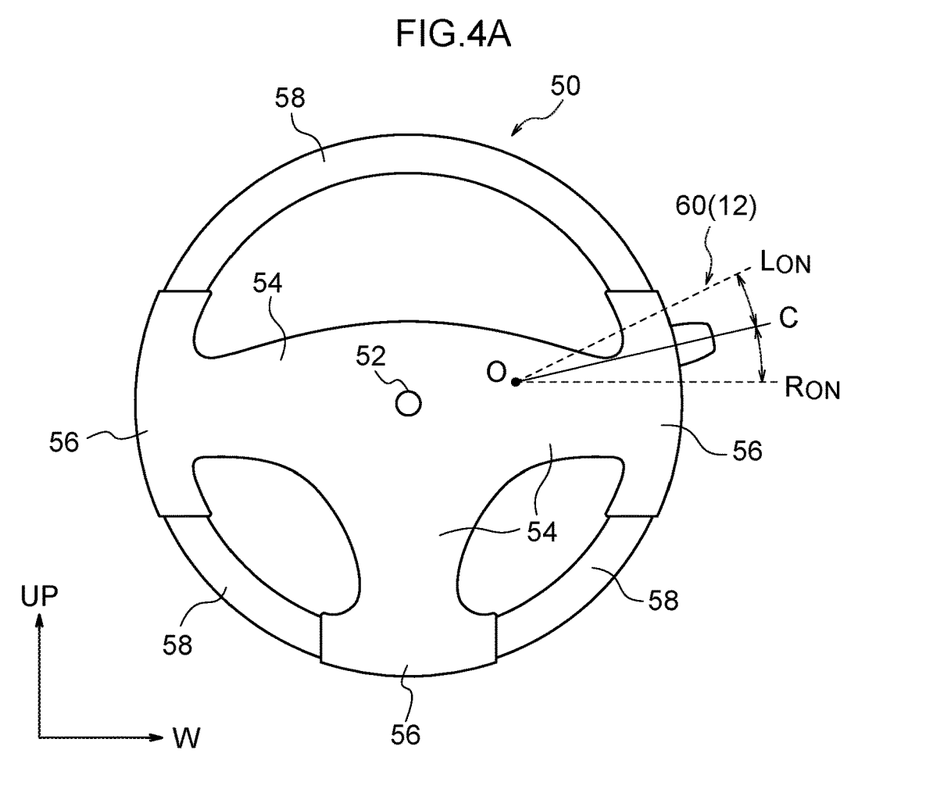
FIG. 4A is a front view that is seen from the driver and shows an operation portion (a steering and turn signal lever) that constructs the vehicle periphery monitoring device shown in FIG. 1.
Figure 4B:
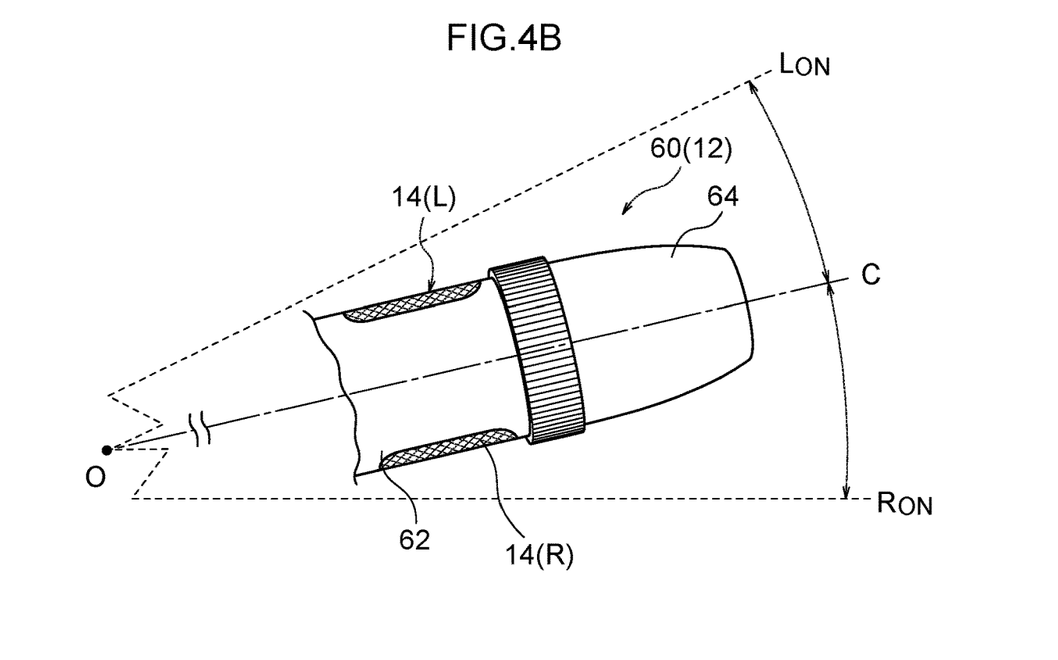
FIG. 4B is an enlarged front view showing, in an enlarged manner, the operation portion (the turn signal lever) shown in FIG. 4A.

Returning to FIG. 1, the point at infinity moving section 18 is structured to include an operation portion 12, a sensing section 14, and (a portion of) the image control section 16. As shown in FIG. 4A and FIG. 4B, in the present embodiment, the operation portion 12 is a turn signal lever 60 that is disposed around a steering 50 as seen from the driver.

Here, the steering 50 is a steering wheel, and is structured to include spokes 54 that are connected to a steering shaft 52 via a boss portion, grip portions 56, and decorative portions 58. With the steering shaft 52 being the center, the three spokes 54 extend out respectively toward the vehicle transverse direction both sides and the vehicle lower side here, and the grip portions 56 are disposed at the extended end portions of the spokes 54, respectively. The decorative portions 58 are disposed between the grip portions 56. The steering 50 can be rotated clockwise and counterclockwise around the steering shaft 52, and changing of the path, such as straight advancing, a right turn, a left turn, a lane change or the like of the vehicle V, can be effected by using the steering 50.

As shown in FIG. 4B, the turn signal lever 60 has a lever main body 62, which is tubular and extends from the steering shaft 52 side toward the vehicle transverse direction right side and slightly toward the upper side, and a switch portion 64 that is provided at the distal end portion in the extending direction of the lever main body 62. The switch portion 64 rotates in at least two stages, and is used as the on/off switch of the position lamps and the lights. When the operation of rotating and moving the turn signal lever 60 from a neutral position C toward the vehicle upper side is carried out, and the turn signal lever 60 reaches an operation completion position $L_{ON}$, the blinkers that are disposed at the vehicle left side portion of the vehicle V blink. Further, when the operation of rotating and moving the turn signal lever 60 from the neutral position C toward the vehicle lower side is carried out, and the turn signal lever 60 reaches an operation completion position $R_{ON}$, the blinkers that are disposed at the vehicle right side portion of the vehicle V blink. When the turn signal lever 60 is returned to the neutral position C, the blinking of the blinkers ends.

As shown in FIG. 1, the vehicle periphery monitoring device 10 relating to the present embodiment is structured such that the operation portion 12 is connected to the image control section 16 via the bus 40, and, when the blinking operation of the turn signal lever 60 is completed, that operation information is outputted to the image control section 16.

In the present embodiment, the sensing section 14 has a sensor 14(L) that is disposed at the upper portion of the lever main body 62, and a sensor 14(R) that is disposed at the lower portion of the lever main body 62 at a position facing the sensor 14(L) at the vehicle lower side thereof. Electrostatic capacity sensing type sensors that sense changes in the electrostatic capacity, or pressure sensing type touch sensors that sense changes in pressure, are used as the sensor 14(L), the sensor 14(R). The results of sensing of the sensor 14(L), the sensor 14(R) respectively are outputted to the image control section 16 via the bus 40. Note that the sensor 14(L), the sensor 14(R) respectively may be disposed at the switch portion 64, or at both the lever main body 62 and the switch portion 64.

At the point at infinity moving section 18, in regard to a request to change the viewpoint of the driver toward a vehicle rear lateral side, the position of the virtual viewpoint VP (see FIG. 2) is moved toward the vehicle lateral side, and composite image information (second composite image information or third composite image information) that combines the first image information and the second image information is generated. This composite image information is displayed as a composite image on the display region 30B of the image display device 30.

In further detail, before a path change such as, for example, a left turn, or a lane change into the lane at the left side, or the like, the driver touches the sensor 14(L), which is shown in FIG. 4B, of the operation portion 12. Due to this operation, the sensor 14(L) senses a request to change the viewpoint toward the vehicle rear left side, and the results of sensing are outputted from the sensor 14(L) to the image control section 16. At the point at infinity moving section 18, the point at infinity P1 and the point at infinity P3 are made to coincide approximately in the middle of the first position of the point at infinity P1 and the second position of the point at infinity P3 that are shown in FIG. 3B, and the first image information and the second image information are combined, and second composite image information is generated. In this second composite image information, the point at infinity P2 is made to approximately coincide with the position at which the point at infinity P1 and the point at infinity P3 are made to coincide.

Figure 5A:
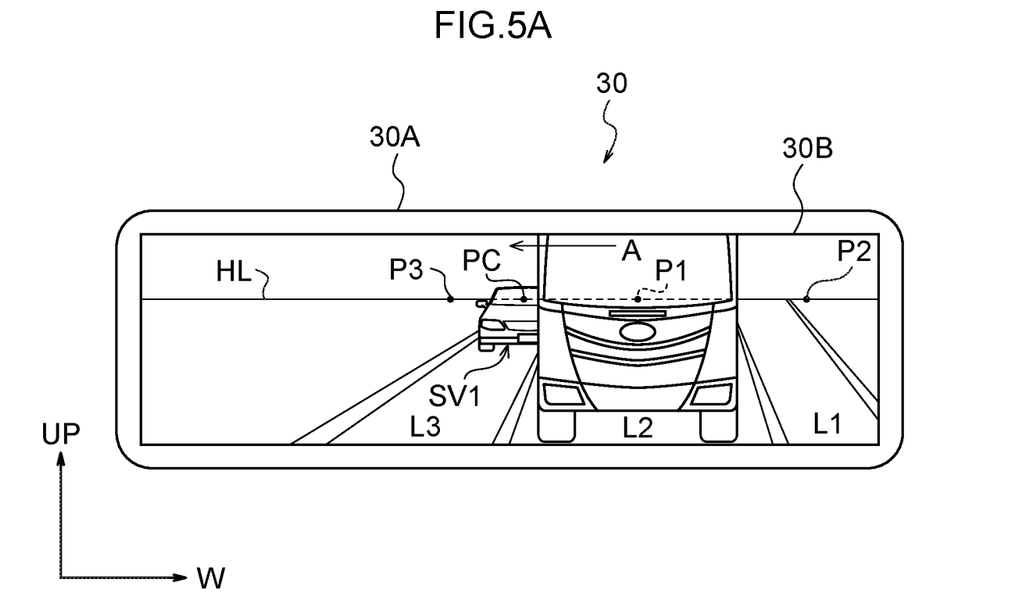
FIG. 5A is a front view that corresponds to FIG. 3A and shows a composite image that is displayed on the image display device at a time when a point at infinity is moved by using a point at infinity moving section that constructs the vehicle periphery monitoring device shown in FIG. 1.

This second composite image information is outputted to the image display device 30, and, as shown in FIG. 5A, a composite image that is based on the second composite image information is displayed in the display region 30B. As shown conveniently in FIG. 5A, the point at infinity P1 of the first composite image information moves from the first position toward the left side as shown by arrow A. As a result, as shown in FIG. 2, the composite image is displayed on the display region 30B as an image that is viewed from virtual viewpoint VP1 that has been moved toward the left side from the virtual viewpoint VP.

Figure 5B:
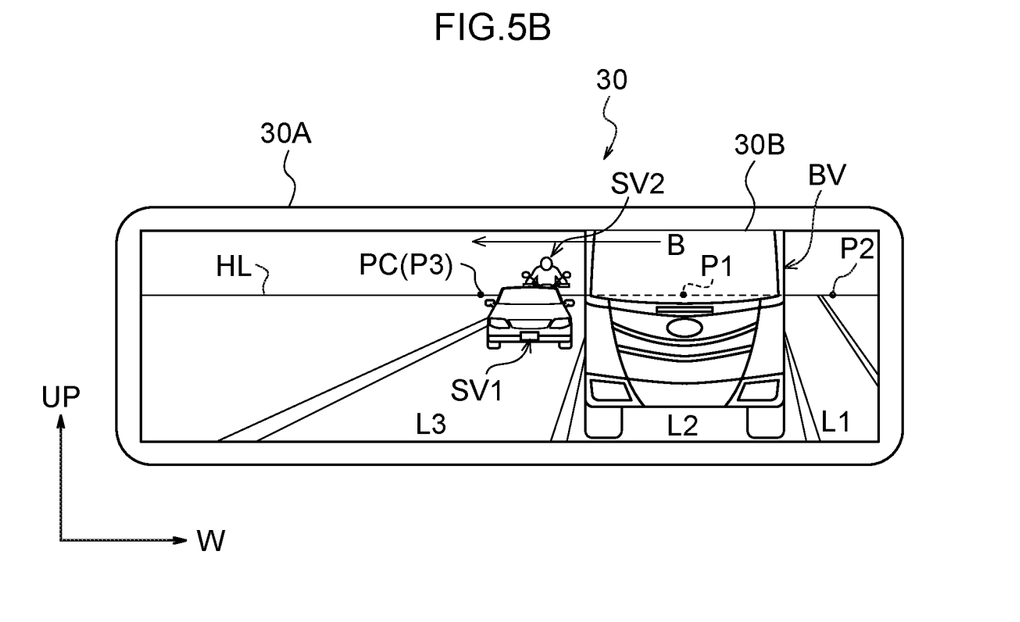
FIG. 5B is a front view that corresponds to FIG. 3A and shows a composite image that is displayed on the image display device at a time when the point at infinity is moved further.

Moreover, when the driver moves the turn signal lever 60 from the neutral position C to the operation completion position $L_{ON}$ shown in FIG. 4A and FIG. 4B, the blinker at the vehicle left side portion blinks, and that operation information is outputted to the image control section 16. At the point at infinity moving section 18, the point at infinity P1 is made to approximately coincide with the point at infinity P3 at the second position of the point at infinity P3 that is shown in FIG. 3B, and third composite image information that combines the first image information and the second image information is generated. In the third composite image information, the point at infinity P2 is made to coincide with the position at which the point at infinity P1 and the point at infinity P3 approximately coincide. This third composite image information is outputted to the image display device 30, and, as shown in FIG. 5B, a composite image that is based on the third composite image information is displayed on the display region 30B. As shown conveniently in FIG. 5B, the point at infinity P1 of the first composite image information moves from the first position further toward the left side as shown by arrow B. As a result, as shown in FIG. 2, the composite image is displayed on the display region 30B as an image that is viewed from virtual viewpoint VP2 that has been moved further toward the left side from the virtual viewpoint VP. Note that the point at infinity moving section 18 is structured such that the proportion of the first image information of the image information 22B shown in FIG. 2 is decreased and the proportion of the second image information being displayed prioritarily increases, in accordance with the amount of movement toward the virtual viewpoint VP, the virtual viewpoint VP1 and the virtual viewpoint VP2.

Here, although displayed in the image 34 that is shown in FIG. 3B, the laterally rearward vehicle SV1 and the laterally rearward vehicle SV2 are blocked in the composite image that is based on the first composite image information shown in FIG. 3A. By successively moving from the virtual viewpoint VP to the virtual viewpoint VP1 and the virtual viewpoint VP2, as shown in FIG. 5A and FIG. 5B, the laterally rearward vehicle SV1 and the laterally rearward vehicle SV2 can gradually be confirmed.

Although detailed description thereof is omitted, cases of path changes such as a right turn, or a lane change into the lane at the right side, or the like are similar to cases of path changes such as a left turn, or a lane change into the lane at the left side, or the like. Namely, when the driver touches the sensor 14(R) shown in FIG. 4B, as shown in FIG. 2, a composite image is displayed on the display region 30B as an image viewed from virtual viewpoint VP3 which has been moved toward the right side from the virtual viewpoint VP. Moreover, when the driver moves the turn signal lever 60 from the neutral position C to the operation completion position $R_{ON}$ shown in FIG. 4A and FIG. 4B, the blinker at the vehicle right side portion blinks. Due to this operation, a composite image is displayed on the display region 30B as an image that is viewed from virtual viewpoint VP4 that has been moved further toward the right side from the virtual viewpoint VP shown in FIG. 2.

Note that, although illustrated schematically, the bus 40 shown in FIG. 1 is actually constructed by wired or wireless connection, or by combining wired connection and wireless connection.

Figure 8:
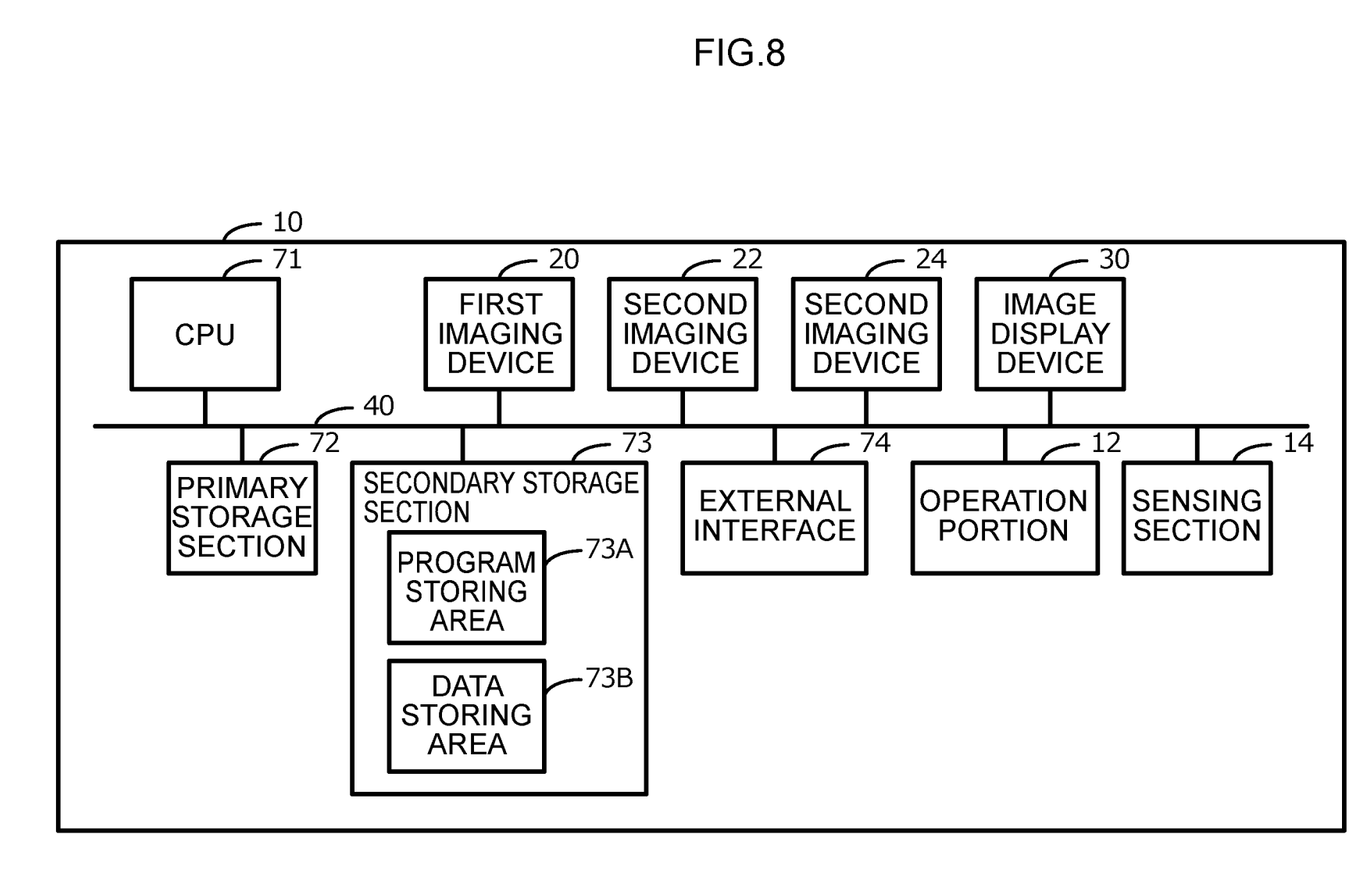
FIG. 8 is a block drawing exemplifying the hardware structures of the vehicle periphery monitoring device.

An example of the hardware structures of the vehicle periphery monitoring device 10 is shown in FIG. 8. The vehicle periphery monitoring device 10 includes a CPU (Central Processing Unit) 71 that is an example of a processor that is hardware, a primary storage section 72, a secondary storage section 73, an external interface 74, the first imaging device 20, the second imaging devices 22 and 24, the image display device 30, the operation portion 12, and the sensing section 14.

The CPU 71, the primary storage section 72, the secondary storage section 73, the external interface 74, the first imaging device 20, the second imaging devices 22 and 24, the image display device 30, the operation portion 12 and the sensing section 14 are connected to one another via the bus 40.

The primary storage section 72 is a volatile memory such as, for example, a RAM (Random Access Memory) or the like. The secondary storage section 73 is a non-volatile memory such as, for example, a ROM (Read Only Memory), an HDD (Hard Disk Drive), an SSD (Solid State Drive) or the like.

The secondary storage section 73 includes a program storing area 73A and a data storing area 73B. The program storing area 73A stores programs such as, for example, a vehicle periphery monitoring program for causing the CPU 71 to execute vehicle periphery monitoring processing, and the like. The data storing area 73B stores data acquired from the first imaging device 20, the second imaging devices 22 and 24, and the sensing section 14, and intermediate data that is generated temporarily in the vehicle periphery monitoring processing, and the like.

The CPU 71 reads-out the vehicle periphery monitoring program from the program storing area 73A, and expands the program in the primary storage section 72. The CPU 71 operates as the image control section 16 and the point at infinity moving section 18 of FIG. 1 by loading and executing the vehicle periphery monitoring program. Note that the programs such as the vehicle periphery monitoring program and the like may be stored on a non-transitory storage medium such as a DVD (Digital Versatile Disk) or the like, and read-in via a recording medium reading device and expanded in the primary storage section 72.

An external device is connected to the external interface 74, and the external interface 74 governs the transmitting and receiving of various types of information between the external device and the CPU 71. Note that the first imaging device 20, the second imaging devices 22 and 24, the image display device 30, the operation portion 12 and the sensing section 14 may be externally connected via the external interface 74 for example, without being incorporated into the vehicle periphery monitoring device 10.

(Image Display Method of Vehicle Periphery Monitoring Device)

Figure 6:
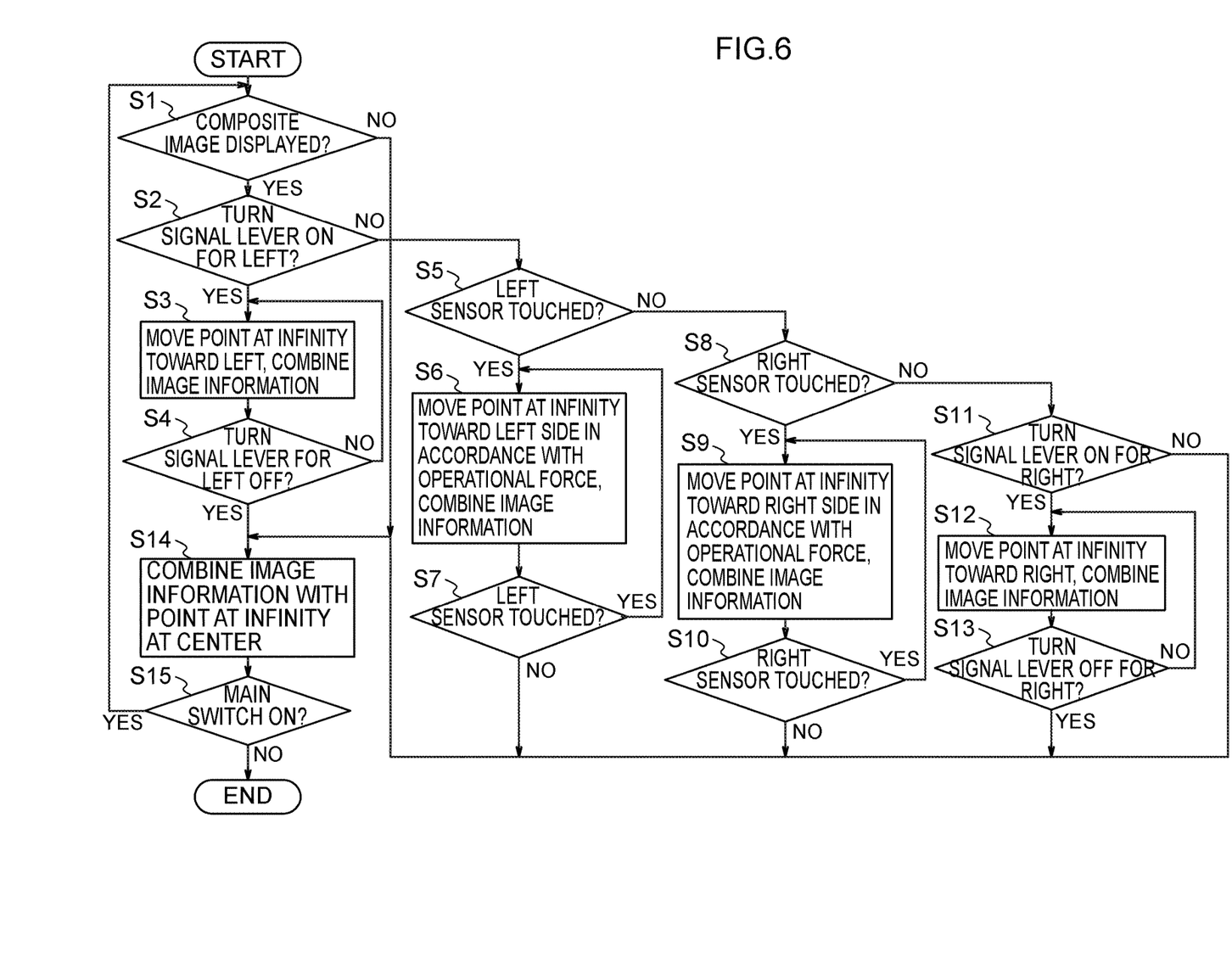
FIG. 6 is a flowchart explaining an image display method of the vehicle periphery monitoring device shown in FIG. 1.

The image display method of the vehicle periphery monitoring device 10 is described next by using FIG. 6 and with reference to FIG. 1 through FIG. 5B.

First, when the main switch of the vehicle periphery monitoring device 10 is turned on, it is judged (S1) whether or not the composite image, which is displayed on the display region 30B of the image display device 30, is a composite image that has been generated on the basis of the first composite image information shown in FIG. 3A. Here, the main switch is structured so as to be operated in conjunction with the starting of the engine of the vehicle V. Further, the first composite image information is generated as follows. First, the first image information that is captured by using the first imaging device 20 shown in FIG. 1, and the second image information that are captured by using the second imaging device 22 and the second imaging device 24, are acquired by the image control section 16. As shown in FIG. 3B, the image 32 of the vehicle rear side is generated on the basis of the first image information, and the images 34 and the image 36 are generated on the basis of the second image information.

At the image control section 16, the point at infinity P2 of the image 36 and the point at infinity P3 of the image 34 are made to coincide with the point at infinity P1 of the image 32 that is shown conveniently in FIG. 3B, and the first image information and the second image information are combined, and the first composite image information that is shown in FIG. 3A is generated. This first composite image information is an image that is viewed from the virtual viewpoint VP shown in FIG. 2, and the first composite image information is outputted to the image display device 30.

If it is judged in step S1 that the composite image is displayed, it is judged (S2) whether or not the turn signal lever 60, which serves as the operation portion 12 and is shown in FIG. 1, FIG. 4A and FIG. 4B, has been operated to the operation completion position $L_{ON}$. Namely, it is judged whether or not the driver is planning a path change toward the left side and has made the blinker at the vehicle left side portion blink.

If it is judged that the turn signal lever 60 has been operated to the operation completion position $L_{ON}$, the third composite image information is generated (S3) by using the point at infinity moving section 18 shown in FIG. 1.

The third composite image information is generated as follows. First, in the same way as in the generating of the first composite image information, the first image information and the second image information are acquired by the point at infinity moving section 18. Because the point at infinity moving section 18 is structured so as to include a portion of the image control section 16, the first image information and the second image information are acquired by the image control section 16 in the same order as in the method of generating the first composite image information. When the blinker operation information is outputted to the point at infinity moving section 18, at the point at infinity moving section 18, the point at infinity P1 of the image 32 and the point at infinity P2 of the image 36 are made to coincide with the point at infinity P3 of the image 34 that is shown conveniently in FIG. 3B, and the first image information and the second image information are combined. Due to this combining, the third composite image information that is shown in FIG. 5B is generated. This third composite image information is an image that is seen from the virtual viewpoint VP2 shown in FIG. 2, and the third composite image information is outputted to the image display device 30.

After the third composite image information is generated, it is judged (S4) whether or not the turn signal lever 60 shown in FIG. 4A and FIG. 4B has been operated from the operation completion position $L_{ON}$ to the neutral position C. Namely, it is judged whether or not the blinking operation of the blinker at the vehicle left side portion has been ended. If it is judged that the blinking operation has not been ended, the routine returns to step S3. If it is judged that the blinking operation has been ended, at the image control section 16 shown in FIG. 1, the point at infinity P1, the point at infinity P2 and the point at infinity P3 are made to coincide at position PC, and the first image information and the second image information are combined, and the first composite image information is generated (S14). The first composite image information is an image seen from the virtual viewpoint VP shown in FIG. 2, and, as shown in FIG. 3A, the first composite image information is outputted to the image display device 30.

Subsequently, it is judged whether or not the main switch of the vehicle periphery monitoring device 10 is on (S15). If it is judged that the main switch is on, the routine returns to step S1. On the other hand, if it is judged that the main switch is not on, e.g., in a case in which the engine is stopped, the image display operation of the vehicle periphery monitoring device 10 ends.

In step S2, in a case in which it is judged that the turn signal lever 60 has not been operated to the operation completion position $L_{ON}$, it is judged (S5) whether or not the sensor 14(L) disposed at the turn signal lever 60 shown in FIG. 4B has been touched. Before a path change toward the left side of the vehicle V, the driver first confirms whether or not the laterally rearward vehicle SV1 (or SV2) exists at the vehicle rear left side. After confirming that a lane change is possible, the driver operates the turn signal lever 60, and makes the blinker at the vehicle left side portion blink. Namely, the operation of the driver touching the sensor 14(L) is a request to change the viewpoint toward the vehicle rear left side before operation of the turn signal lever 60.

If it is judged that the sensor 14(L) has been touched, second composite image information is generated (S6) by using the point at infinity moving section 18 shown in FIG. 1. The second composite image information is generated as follows. First, in the same way as in the generating of the first composite image information, the first image information and the second image information are acquired by the point at infinity moving section 18. When a request to change the viewpoint toward the vehicle rear left side is sensed by using the sensor 14(L), the results of sensing are outputted to the point at infinity moving section 18. At the point at infinity moving section 18, the point at infinity P1, the point at infinity P3 and the point at infinity P2 of the image 36 are made to coincide at the middle of the first position of the point at infinity P1 of the image 32 and the second position of the point at infinity P3 of the image 34 that are conveniently shown in FIG. 3B, and the first image information and the second image information are combined. The second composite image information shown in FIG. 5A is generated by this combining. This second composite image information is an image seen from the virtual viewpoint VP1 shown in FIG. 2, and the second composite image information is outputted to the image display device 30.

Here, in the vehicle periphery monitoring device 10 relating to the present embodiment, the position of the virtual viewpoint VP1 is changed in accordance with the force of the operation of touching the sensor 14(L). Namely, if the sensor 14(L) is touched lightly, the movement of the virtual viewpoint VP1 toward the virtual viewpoint VP2 side is small. Conversely, if the sensor 14(L) is touched strongly, the movement of the virtual viewpoint VP1 toward the virtual viewpoint VP2 side is large. The structure for changing the amount of movement of the virtual viewpoint VP1 in accordance with the force of operating the sensor 14(L) is the same for the sensor 14(R) that is described later.

After the second composite image information is generated, it is judged (S7) whether or not the touching of the sensor 14(L) shown in FIG. 4B is being continued. If it is judged that the touching is being continued, the routine returns to step S6. If it is judged that the touching is not being continued, the routine moves on to step S14.

In step S5, if it is judged that the sensor 14(L) is not being touched, it is judged (S8) whether or not the sensor 14(R) that is disposed at the turn signal lever 60 shown in FIG. 4B has been touched.

In the same way as before a path change toward the left side of the vehicle V, before a path change toward the right side of the vehicle V, the driver first confirms whether or not a laterally rearward vehicle exists at the vehicle rear right side. After confirming that a lane change is possible, the driver operates the turn signal lever 60, and makes the blinker at the vehicle right side portion blink.

If it is judged that the sensor 14(R) has been touched, second composite image information is generated (S9) by using the point at infinity moving section 18 shown in FIG. 1. The second composite image information is generated as follows. First, in the same way as in the generating of the first composite image information, the first image information and the second image information are acquired by the point at infinity moving section 18. When a request to change the viewpoint toward the vehicle rear right side is sensed by using the sensor 14(R), the results of sensing are outputted to the point at infinity moving section 18. At the point at infinity moving section 18, the point at infinity P1, the point at infinity P2 and the point at infinity P3 are made to coincide at the middle of the first position of the point at infinity P1 of the image 32 and the second position of the point at infinity P2 of the image 36 that are conveniently shown in FIG. 3B, and the first image information and the second image information are combined. The second composite image information, in which the viewpoint has been moved toward the right side from the first composite image information, is generated by this combining (see FIG. 5A). This second composite image information is an image seen from the virtual viewpoint VP3 shown in FIG. 2, and the second composite image information is outputted to the image display device 30.

After the second composite image information is generated, it is judged (S10) whether or not the touching of the sensor 14(R) shown in FIG. 4B is being continued. If it is judged that the touching is being continued, the routine returns to step S9. If it is judged that the touching is not being continued, the routine moves on to step S14.

In step S8, if it is judged that the sensor 14(R) is not being touched, it is judged (S11) whether or not the turn signal lever 60 shown in FIG. 4A and FIG. 4B has been operated to the operation completion position $R_{ON}$. Namely, it is judged whether or not the driver is planning a path change toward the right side and has made the blinker at the vehicle right side portion blink.

If it is judged that the turn signal lever 60 has been operated to the operation completion position $R_{ON}$, the third composite image information is generated (S12) by using the point at infinity moving section 18 shown in FIG. 1.

The third composite image information is generated as follows. First, in the same way as in the generating of the first composite image information, the first image information and the second image information are acquired by the point at infinity moving section 18. When the blinker operation information is outputted to the point at infinity moving section 18, at the point at infinity moving section 18, the point at infinity P1 of the image 32 and the point at infinity P3 of the image 34 are made to coincide with the point at infinity P2 of the image 36 that is shown conveniently in FIG. 3B, and the first image information and the second image information are combined. Due to this combining, the third composite image information, in which the viewpoint has been moved to the right side from the first composite image information, is generated (see FIG. 5B). This third composite image information is an image that is seen from the virtual viewpoint VP4 shown in FIG. 2, and the third composite image information is outputted to the image display device 30.

After the third composite image information is generated, it is judged (S13) whether or not the turn signal lever 60 shown in FIG. 4B has been operated from the operation completion position $R_{ON}$ to the neutral position C. Namely, it is judged whether or not the blinking operation of the blinker at the vehicle left side portion has been ended.

If it is judged that the blinking operation has not been ended, the routine returns to step S12. If it is judged that the blinking operation has been ended, the routine moves on to step S14.

In step S11, if it is judged that the turn signal lever 60 has not been operated to the operation completion position $R_{ON}$, the routine moves on to step S14.

Operation and Effects of Present Embodiment

As shown in FIG. 1, the vehicle periphery monitoring device 10 relating to the present embodiment has the image control section 16 and the point at infinity moving section 18. The image control section 16 acquires the first image information of the vehicle rear side and the second image information of the vehicle rear lateral sides, which have been captured by using the imaging devices. At the image control section 16, the point at infinity P2 and the point at infinity P3 at the second position in the vehicle transverse direction of the second image information are made to approximately coincide with the point at infinity P1 at the first position in the vehicle transverse direction of the first image information shown in FIG. 3B, and the first image information and the second image information are combined. Due to this combining, the first composite image information that is shown in FIG. 3A is generated. The first composite image information is outputted to the image display device 30.

Here, when a request to change the viewpoint toward the vehicle rear left side is sensed, the point at infinity moving section 18 makes the point at infinity P1, the point at infinity P2 and the point at infinity P3 substantially coincide in the middle of the first position and the second position, and combines the first image information and the second image information, and generates the second composite image information that is shown in FIG. 5A. Also when a request to change the viewpoint toward the vehicle rear right side is sensed, the point at infinity moving section 18 similarly generates second composite image information. The second composite image information is outputted to the image display device 30 as a composite image that is seen from the virtual viewpoint VP1 or the virtual viewpoint VP3 shown in FIG. 2.

Further, when the path changing operation of the operation portion 12 that is used in changing the path toward the vehicle left side is completed, the point at infinity moving section 18 makes the point at infinity P1 and the point at infinity P2 coincide with the point at infinity P3 at the second position, and combines the first image information and the second image information, and generates the third composite image information that is shown in FIG. 5B. In further detail, the operation portion 12 is the turn signal lever 60 shown in FIG. 4A and FIG. 4B. When the turn signal lever 60 is operated from the neutral position C to the operation completion position $L_{ON}$, the operation of changing the path is completed. Also when the path changing operation of the operation portion 12 that is used in changing the path toward the vehicle right side is completed, the point at infinity moving section 18 generates the third composite image information. The third composite image information is outputted to the image display device 30 as a composite image seen from the virtual viewpoint VP2 or the virtual viewpoint VP4 shown in FIG. 2.

Therefore, before the operation of changing the path of the vehicle V is completed, a region that is blocked by a combined region of the first composite image information shown in FIG. 3A (e.g., that is blocked by the following vehicle BV or the laterally rearward vehicle SV1), e.g., the image of the laterally rearward vehicle SV2, is made to be a composite image (see FIG. 5A) that is based on the second composite image information that is seen from the virtual viewpoint VP1 or the virtual viewpoint VP3 that has been moved toward a vehicle lateral side shown in FIG. 2. Therefore, the existence of the laterally rearward vehicle SV2 can be confirmed. In addition, after the operation of changing the path of the vehicle V is completed, there is made to be a composite image (see FIG. 5B) that is seen from the virtual viewpoint VP2 or the virtual viewpoint VP4 that has been moved further toward a vehicle lateral side shown in FIG. 2, and therefore, the existence of the laterally rearward vehicle SV2 can be confirmed more clearly.

Accordingly, there can be provided the vehicle periphery monitoring device 10 that, before and after completion of the operation of changing the path, enables viewing of the laterally rearward vehicle SV2 that is blocked by the following vehicle BV in the composite image.

Further, at the vehicle periphery monitoring device 10 relating to the present embodiment, as shown in FIG. 1, the imaging devices include the first imaging device 20, the second imaging device 22 and the second imaging device 24. As shown in FIG. 2, the first imaging device 20 captures an image of the vehicle rear side and generates the first image information. The second imaging device 22 and the second imaging device 24 capture images of the vehicle rear lateral sides and generate the second image information. Then, the image display device 30 displays any of a composite image that is based on the first composite image information shown in FIG. 3A, a composite image that is based on the second composite image information shown in FIG. 5A, and a composite image that is based on the third composite image information shown in FIG. 5B. The vehicle periphery monitoring device 10, which is installed the vehicle V and includes the image control section 16, the point at infinity moving section 18, the first imaging device 20, the second imaging device 22, the second imaging device 24 and the image display device 30, can thereby be constructed as shown in FIG. 1.

Moreover, at the vehicle periphery monitoring device 10 relating to the present embodiment, as shown in FIG. 1, the point at infinity moving section 18 has the sensing section 14 that senses a request to change the viewpoint. The sensing section 14 is disposed at the operation portion 12. As shown in FIG. 4A and FIG. 4B, here, the operation portion 12 is the turn signal lever 60, and the sensing section 14 is the sensor 14(L) and the sensor 14(R) and is disposed at the lever main body 62 of the turn signal lever 60.

Therefore, because the sensing section 14 is disposed at the operation portion 12, the virtual viewpoint VP is moved immediately in relation to the operation of changing the path that uses the operation portion 12, and a composite image, which is based on the second composite image information or the third composite image information of the vehicle rear side and the vehicle rear lateral sides, can be displayed on the image display device 30.

Further, in the vehicle periphery monitoring device 10 relating to the present embodiment, as shown in FIG. 4A and FIG. 4B, the operation portion 12 is the turn signal lever 60 that is used in changing the path of the vehicle V. Therefore, the virtual viewpoint VP is moved immediately in relation to the operation of changing the path that uses the turn signal lever 60, and a composite image, which is based on the second composite image information or the third composite image information of the vehicle rear side and the vehicle rear lateral sides, can be displayed on the image display device 30.

Moreover, in the vehicle periphery monitoring device 10 relating to the present embodiment, as shown in FIG. 4B, the sensing section 14 is the sensor 14(L) and the sensor 14(R) that serve as touch sensors. Therefore, a request to change the viewpoint toward a vehicle laterally rear side can be sensed by a simple structure, and the virtual viewpoint VP is moved immediately in relation to the path changing operation of the operation portion 12, and a composite image, which is based on the second composite image information of the vehicle rear side and the vehicle rear lateral sides, can be displayed on the image display device 30.

Modified Example

In the vehicle periphery monitoring device 10 relating to a modified example of the first embodiment, the sensing section 14 is Hall sensors instead of touch sensors. The Hall sensors are disposed at the turn signal lever 60 that serves as the operation portion 12 shown in FIG. 4A and FIG. 4B. At the Hall sensor, the path changing operation of the turn signal lever 60, i.e., the rotation angle from the neutral position C until before reaching the operation completion position $L_{ON}$, is sensed by using the magnetic field, and an analog signal that is proportional to the magnitude of the rotation angle is outputted as operation information. On the basis of this operation information, the virtual viewpoint VP is moved to the virtual viewpoint VP1 at the vehicle periphery monitoring device 10.

Similarly, at the Hall sensor, the rotation angle of the turn signal lever 60 from the neutral position C until before reaching the operation completion position $R_{ON}$, is sensed, and operation information that is proportional to the magnitude of the rotation angle is outputted. On the basis of this operation information, the virtual viewpoint VP is moved to the virtual viewpoint VP3 at the vehicle periphery monitoring device 10.

A composite image, which is based on the second composite image information that is seen from the virtual viewpoint VP1 or the virtual viewpoint VP3, is displayed at the image display device 30. Then, at the vehicle periphery monitoring device 10, the amount of movement of the virtual viewpoint VP is changed in proportion to the magnitude of the rotation angle of the turn signal lever 60.

Second Embodiment

Figure 7:
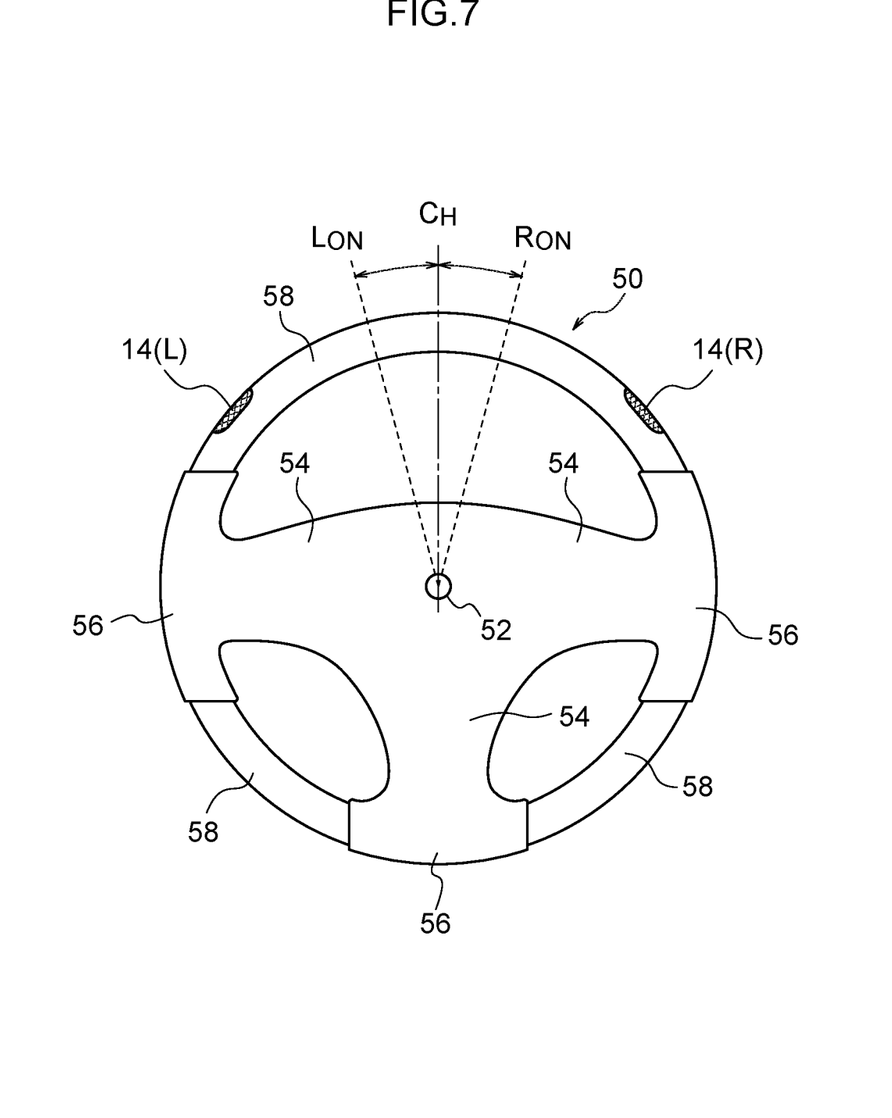
FIG. 7 is a front view that is seen from the driver and shows an operation portion (a steering) that constructs a vehicle periphery monitoring device relating to a second embodiment of the present disclosure.

The vehicle periphery monitoring device 10 relating to a second embodiment of the present disclosure is described by using FIG. 7. Note that, in the present embodiment, structural elements that are the same as, and structural elements that are substantially the same as, the structural elements of the vehicle periphery monitoring device 10 relating to the first embodiment are denoted by the same reference numerals, and repeat explanation is omitted.

In the same way as the vehicle periphery monitoring device 10 relating to the first embodiment, the vehicle periphery monitoring device 10 relating to the present embodiment has the image control section 16 and the point at infinity moving section 18 as the main structures thereof (see FIG. 1). Moreover, the vehicle periphery monitoring device 10 has the first imaging device 20, the second imaging device 22, the second imaging device 24 and the image display device 30.

The point at infinity moving section 18 is structured to include the operation portion 12, the sensing section 14 and a portion of the image control section 16. Instead of the turn signal lever 60 that is shown in above-described FIG. 4A and FIG. 4B, the operation portion 12 is the steering 50 that is shown in FIG. 7. The steering 50 is used in changing the path of the vehicle V.

The sensing section 14 has the sensor 14(L), which is disposed at the outer side periphery of the decorative portion 58 at the upper portion of the grip portion 56 that is at the left side of the steering 50, and the sensor 14(R), which is disposed at the outer side periphery of the decorative portion 58 at the upper portion of the grip portion 56 that is at the right side. As seen from the driver, the sensor 14(L), the sensor 14(R) respectively are disposed exactly at clock positions of 10:10. Moreover, the sensor 14(L), the sensor 14(R) are both structured by touch sensors, in the same way as the sensor 14(L), the sensor 14(R) respectively in the first embodiment.

If the sensor 14(L) is touched, second composite image information that is seen from the virtual viewpoint VP1 shown in above-described FIG. 2 is generated by using the point at infinity moving section 18. Further, if the sensor 14(R) is touched, second composite image information that is seen from the virtual viewpoint VP3 is generated by using the point at infinity moving section 18. The composite image that is based on the second composite image information is displayed on the image display device 30 (see FIG. 5A).

On the other hand, as shown in FIG. 7, "play", in which the tires do not move even if the steering 50 is operated, is set at the steering 50 from neutral position CH to the operation completion position $L_{ON}$ at the left side. Similarly, "play" is set at the steering 50 from the neutral position CH to the operation completion position $R_{ON}$ at the right side.

If operation of the steering 50 goes past the "play", steering angular force information from a steering sensor is outputted, and this steering angular force information is outputted to the point at infinity moving section 18 as operation information. At the point at infinity moving section 18, third composite image information, which is seen from the virtual viewpoint VP2 or the virtual viewpoint VP4 shown in above-described FIG. 2, is generated on the basis of the operation information. The composite image that is based on this third composite image information is displayed on the image display device 30 (see FIG. 5B).

In the vehicle periphery monitoring device 10 relating to the present embodiment, the operation portion 12 is the steering 50, and the sensing section 14 is the sensor 14(L) and the sensor 14(R) that are disposed at the steering 50, but operation and effects that are similar to the operation and effects obtained by the vehicle periphery monitoring device 10 relating to the first embodiment can be obtained.

Supplementary Description of Above-Described Embodiments

The present disclosure is not limited to the above-described embodiments, and can be modified within a scope that does not depart from the gist thereof.

For example, in the present disclosure, the vehicle periphery monitoring device relating to the above-described first embodiment and the vehicle periphery monitoring device relating to the above-described second embodiment may be combined. In further detail, a vehicle periphery monitoring device may be constructed by sensors, which serve as the detecting section of the point at infinity moving section, being disposed at the steering (see FIG. 7), and the operation portion being made to be the turn signal lever (see FIG. 4A and FIG. 4B). At this time, because the turn signal lever is disposed around the steering in a vicinity thereof, the detecting section is disposed in a vicinity of the operation portion. If such an arrangement layout is employed, the driver can, while concentrating on driving, immediately move the virtual viewpoint in relation to this path changing operation that uses the operation portion, and can cause the composite image to be displayed.

Further, in the present disclosure, in the vehicle periphery monitoring device relating to the above-described second embodiment, sensors serving as the sensing section may be disposed at the grip portions or the spokes of the steering.

Moreover, in the above-described present embodiment, the point at infinity moving section is structured so as to make the three points at infinity that are the point at infinity of the first image information at the vehicle rear side, the point at infinity of the second image information at the vehicle rear left side, and the point at infinity of the second image information at the vehicle rear right side, coincide with one another, and generates composite image information. In the present disclosure, in a case in which the driver wishes to confirm an image of a requested vehicle rear lateral side, e.g., the driver wishes to confirm the image of the vehicle rear left side, the point at infinity of the first image information at the vehicle rear side and the point at infinity of the second image information at the vehicle rear left side may be made to coincide, and the composite image information may be generated by using the point at infinity moving section. Similarly, in a case in which the driver wishes to confirm the image of the vehicle rear right side, the point at infinity of the first image information at the vehicle rear side and the point at infinity of the second image information at the vehicle rear right side may be made to coincide, and the composite image information may be generated by using the point at infinity moving section.

Further, the present disclosure may, at the point at infinity moving section, generate at least one of the second composite image information and the third composite image information. Moreover, the present disclosure may have a half mirror that is layered on the vehicle rear side of the display region at the image display device. The half mirror is structured to rotate in the vehicle longitudinal direction. If the angle of the half mirror is adjusted, the driver can see the image that is transmitted through the half mirror and displayed on the image display device, or can see the vehicle rear side and the vehicle rear lateral sides that are reflected in the half mirror.

The disclosure of Japanese Patent Application No. 2017-240702 filed on Dec. 15, 2017 is, in its entirety, incorporated by reference into the present specification.

The invention claimed is:

1. A vehicle periphery monitoring device comprising:
a memory; and
a processor that is connected with the memory and that is configured to;
acquire first image information of a vehicle rear side and second image information of vehicle rear lateral sides that are captured by using imaging devices, and make second points at infinity that are at second positions in a vehicle transverse direction of the second image information approximately coincide with a first point at infinity that is at a first position in the vehicle transverse direction of the first image information, and combines the first image information and the second image information, and generates first composite image information to be outputted to an image display device, and when sensing a request to change a viewpoint toward a vehicle rear lateral side, make the first point at infinity and the second points at infinity approximately coincide in the middle of the first position and a second position, and combine the first image information and the second image information, and generate second composite image information to be outputted to the image display device.

2. The vehicle periphery monitoring device of claim 1, wherein the imaging devices include a first imaging device, which captures images of the vehicle rear side and generates the first image information, and second imaging devices, which capture images of the vehicle rear lateral sides and generate the second image information, and the image display device displays any of the first composite image information, the second composite image information and the third composite image information.

3. The vehicle periphery monitoring device of claim 1, further comprises a sensing section that is disposed at the operation portion or in a vicinity of the operation portion, and that is used to sense a request to change the viewpoint.

4. The vehicle periphery monitoring device of claim 1, wherein the operation portion is a turn signal lever that is used in changing the path of the vehicle, or is a steering that is used in changing the path of the vehicle.

5. The vehicle periphery monitoring device of claim 3, wherein the sensing section is a touch sensor or a Hall sensor.

6. A vehicle periphery monitoring method comprising:
by a processor, acquiring first image information of a vehicle rear side and second image information of vehicle rear lateral sides that are captured by using imaging devices, and making second points at infinity that are at second positions in a vehicle transverse direction of the second image information approximately coincide with a first point at infinity that is at a first position in the vehicle transverse direction of the first image information, and combining the first image information and the second image information, and generating first composite image information to be outputted to an image display device; and when sensing a request to change a viewpoint toward a vehicle rear lateral side, making the first point at infinity and the second points at infinity approximately coincide in the middle of the first position and a second position, and combining the first image information and the second image information, and generating second composite image information to be outputted to the image display device, and, when a path changing operation of an operation portion that is used in changing a path of a vehicle is completed, making the first point at infinity approximately coincide with the second points at infinity at the second position, and combining the first image information and the second image information, and generating third composite image information to be outputted to the image display device.

7. The vehicle periphery monitoring device of claim 1, wherein the processor that is connected with the memory is further configured such that:

when a path changing operation of an operation portion that is used in changing a path of a vehicle is completed, make the first point at infinity approximately coincide with the second points at infinity at the second position, and combine the first image information and the second image information, and generate third composite image information to be outputted to the image display device.

* * * * *